US012646008B2

(12) United States Patent
Miller et al.

(10) Patent No.: US 12,646,008 B2
(45) Date of Patent: Jun. 2, 2026

(54) FEDERATED LEARNING SOLUTIONS FOR MACHINE LEARNING

(71) Applicant: Microsoft Technology Licensing, LLC, Redmond, WA (US)

(72) Inventors: Daniel Keegan Miller, Kirkland, WA (US); Fuhui Fang, Bellevue, WA (US); Thomas François René Portet, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 926 days.

(21) Appl. No.: 17/749,024

(22) Filed: May 19, 2022

(65) Prior Publication Data

US 2023/0376859 A1 Nov. 23, 2023

(51) Int. Cl.
G06N 20/20 (2019.01)
G06F 11/34 (2006.01)
G06F 21/62 (2013.01)

(52) U.S. Cl.
CPC ......... G06N 20/20 (2019.01); G06F 11/3495 (2013.01); G06F 21/6245 (2013.01)

(58) Field of Classification Search
CPC .... G06N 20/20; G06N 3/098; G06F 11/3495; G06F 21/6245; G06F 21/64; G06F 3/0482; G06F 3/04842; G06F 3/0486; H04L 63/0407; H04L 63/101; H04L 63/123
See application file for complete search history.

(56) References Cited

U.S. PATENT DOCUMENTS

| 6,334,146 B1 * | 12/2001 | Parasnis | ................. | G06Q 10/06 |
| | | | | 709/219 |
| 11,310,295 B1 * | 4/2022 | Demmer | ............. | H04L 65/4038 |
| 11,989,627 B1 * | 5/2024 | Bhise | .................. | G06F 18/2113 |
| 12,061,956 B1 * | 8/2024 | Pushkin | .............. | G06F 11/3688 |
| 12,242,930 B2 * | 3/2025 | Pothula | .................... | G06N 5/02 |

(Continued)

OTHER PUBLICATIONS

"International Search Report and Written Opinion issued in PCT Application No. PCT/US23/016500", Mailed Date: Jun. 14, 2023, 15 Pages.

(Continued)

*Primary Examiner* — Hien L Duong

(74) *Attorney, Agent, or Firm* — NovoTechIP International PLLC

(57) ABSTRACT

A data processing system implements receiving, in a first silo, configuration parameters for performing federated training of the machine learning model using data stored in the plurality of second silos, generating a federated learning pipeline for automatically executing a plurality of tasks associated with the federated learning of the machine learning model based on the configuration parameters, causing each respective silo of the plurality of second silos to train the local instance of the machine learning model according to the federated learning pipeline, obtaining, at the first silo, the learnable parameters information associated with the local instance of the machine learning model of each silo of the plurality of second silos, and aggregating the learnable parameters information obtained from the plurality of second silos to obtain a primary instance of the machine learning model that has been fine-tuned according to the learnable parameters information.

20 Claims, 10 Drawing Sheets

(56) References Cited

U.S. PATENT DOCUMENTS

| | | | |
|---|---|---|---|
| 2020/0311300 A1* | 10/2020 | Callcut | G06F 16/256 |
| 2020/0358599 A1* | 11/2020 | Baracaldo Angel | |
| | | | G06F 21/6227 |
| 2020/0364608 A1* | 11/2020 | Anwar | G06N 20/00 |
| 2021/0141940 A1* | 5/2021 | Naqvi | G06F 21/602 |
| 2021/0142223 A1* | 5/2021 | Choudhury | G06F 16/901 |
| 2021/0150037 A1* | 5/2021 | Radhakrishnan | G06N 20/00 |
| 2021/0192078 A1* | 6/2021 | Cosman | G06F 21/6254 |
| 2021/0374617 A1* | 12/2021 | Chu | G06N 20/20 |
| 2022/0207285 A1* | 6/2022 | Niehaus | G06N 3/098 |
| 2022/0237508 A1* | 7/2022 | Shaloudegi | G06F 17/16 |
| 2022/0300618 A1* | 9/2022 | Ding | G06N 5/01 |
| 2022/0374301 A1* | 11/2022 | Arcand | G06Q 10/0633 |
| 2022/0398500 A1* | 12/2022 | Singhal | G06N 3/098 |
| 2022/0414661 A1* | 12/2022 | Hassanzadeh | G06N 3/04 |
| 2023/0031052 A1* | 2/2023 | McAfoose | G06N 20/20 |
| 2023/0101741 A1* | 3/2023 | Yoo | G16H 50/30 |
| | | | 706/10 |
| 2023/0102732 A1* | 3/2023 | Yoo | G06N 20/20 |
| | | | 726/26 |
| 2023/0319099 A1* | 10/2023 | Karimibiuki | H04L 63/145 |
| | | | 726/23 |
| 2023/0334346 A1* | 10/2023 | Lee | G06N 3/098 |
| 2024/0176906 A1* | 5/2024 | Lv | G06F 21/6245 |
| 2024/0428083 A1* | 12/2024 | Gawron | G06N 3/082 |

OTHER PUBLICATIONS

"Devron", Retrieved from: https://web.archive.org/web/20220309142153/https://www.devron.ai/, Mar. 9, 2022, 4 Pages.

"FedA1", Retrieved from: https://web.archive.org/web/20220216120309/https://fate.fedai.org/, Feb. 16, 2022, 4 Pages.

"Flower a Friendly Federated Learning Framework", Retrieved from: https://web.archive.org/web/20220303105221/https://flower.dev/, Mar. 3, 2022, 9 Pages.

"IBM Federated Learning", Retrieved from: https://web.archive.org/web/20220216114952/https://ibmfl.mybluemix.net/, Feb. 16, 2022, 5 Pages.

"Nvidia Clara", Retrieved from: https://web.archive.org/web/20220317093842/https://developer.nvidia.com/clara, Mar. 17, 2022, 4 Pages.

"Nvidia Flare", Retrieved from: https://web.archive.org/web/20220316015256/https://developer.nvidia.com/flare, Mar. 16, 2022, 6 Pages.

"Ray", Retrieved from: https://web.archive.org/web/20220311230240/https://docs.ray.io/en/latest/ray-overview/index.html, Mar. 11, 2022, 3 Pages.

"Rhino Health", Retrieved from: https://web.archive.org/web/20220226200937/https://www.rhinohealth.com/, Feb. 26, 2022, 2 Pages.

"Secure Computation for Business Data", Retrieved from: https://irp.fas.org/agency/dod/jason/secure-comp.pdf, Nov. 2020, 131 Pages.

"sherpa.ai", Retrieved from: https://web.archive.org/web/20220303104414/https://sherpa.ai/, Mar. 3, 2022, 8 Pages.

Dayan, et al., "Federated learning for predicting clinical outcomes in patients with COVID-19", In Journal of Nature Medicine, vol. 27, Oct. 2021, pp. 1735-1743.

Jing, et al., "PaddlePaddle / PaddleFL", Retrieved from: https://github.com/PaddlePaddle/PaddleFL, Dec. 6, 2021, 9 Pages.

Xie, et al., "bytedance / fedlearner", Retrieved from: https://github.com/bytedance/fedlearner, Mar. 22, 2021, 2 Pages.

* cited by examiner

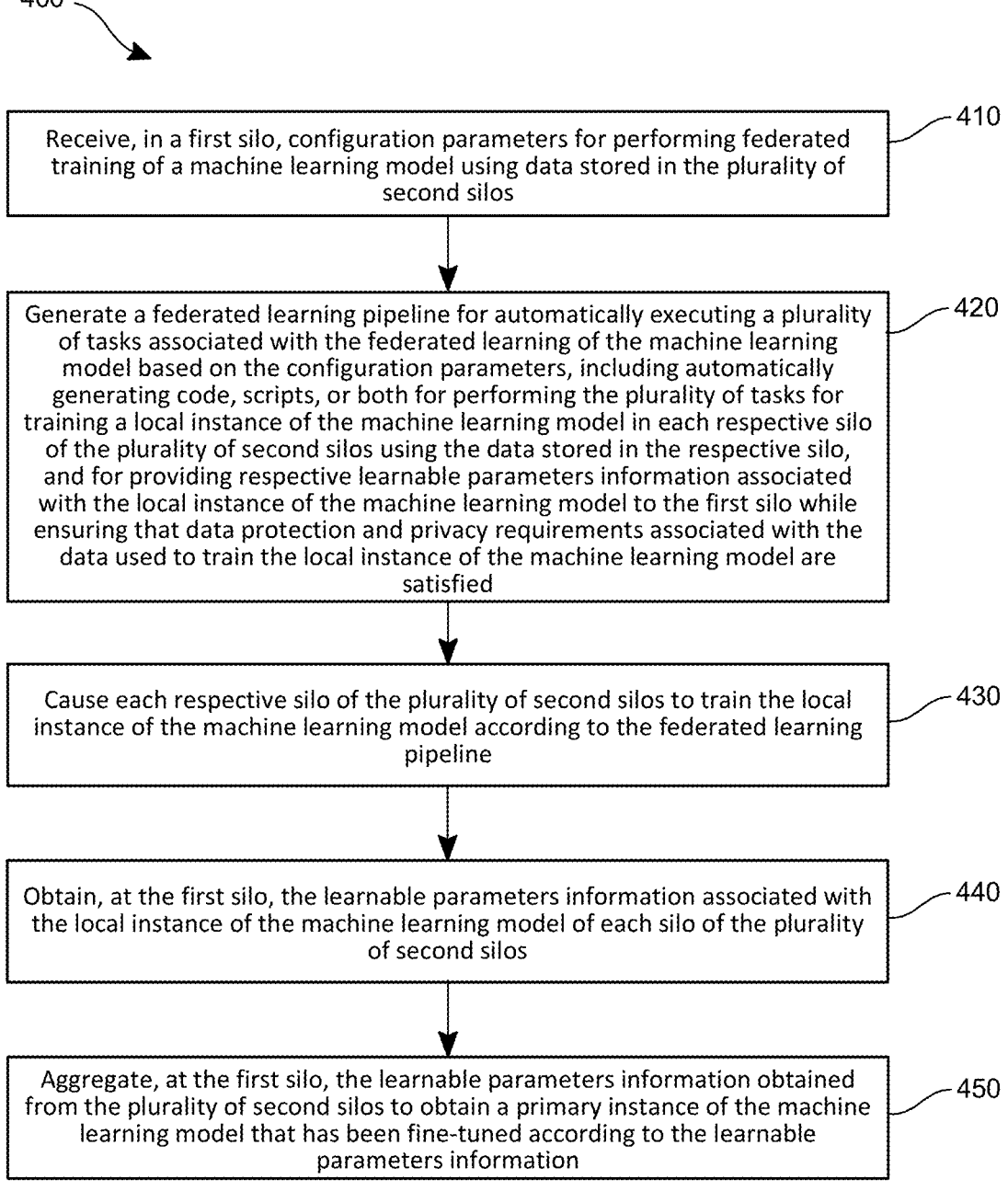

400

Receive, in a first silo, configuration parameters for performing federated training of a machine learning model using data stored in the plurality of second silos — 410

Generate a federated learning pipeline for automatically executing a plurality of tasks associated with the federated learning of the machine learning model based on the configuration parameters, including automatically generating code, scripts, or both for performing the plurality of tasks for training a local instance of the machine learning model in each respective silo of the plurality of second silos using the data stored in the respective silo, and for providing respective learnable parameters information associated with the local instance of the machine learning model to the first silo while ensuring that data protection and privacy requirements associated with the data used to train the local instance of the machine learning model are satisfied — 420

Cause each respective silo of the plurality of second silos to train the local instance of the machine learning model according to the federated learning pipeline — 430

Obtain, at the first silo, the learnable parameters information associated with the local instance of the machine learning model of each silo of the plurality of second silos — 440

Aggregate, at the first silo, the learnable parameters information obtained from the plurality of second silos to obtain a primary instance of the machine learning model that has been fine-tuned according to the learnable parameters information — 450

FIG. 4

FEDERATED LEARNING SOLUTIONS FOR MACHINE LEARNING

BACKGROUND

Machine learning (ML) models are typically trained using large sets of data to adjust the weights, biases, and/or other parameters of the machine learning model based on the data. The data may be stored across multiple cloud-based storage systems, on premises at various data centers, or a combination thereof. Ideally, all the relevant data would be collected at a central location and the model trained using this data. However, for legal and logical reasons this is often impractical or impossible. The sheer amount of data that would need to be collected in the central location may significantly impact network and storage resources to collect all this data in the central location. Additionally, data protection and privacy laws may place strict confidentiality requirements on the usage and storage of data that includes personally identifiable information for data subjects that are residents of certain countries, states or provinces, or other regions that have imposed such laws. A corporation or other entity may have operations in multiple regions that imposed such restrictions on data protection and privacy. Consequently, data containing such personally identifiable information could not legally be moved to a central repository outside of these jurisdictions. Hence, there is a need for improved systems and methods that provide a technical solution for facilitating training ML models where the training data is distributed among multiple locations.

SUMMARY

An example data processing system according to the disclosure may include a processor and a machine-readable medium storing executable instructions. The instructions when executed cause the processor to perform operations including receiving, in a first silo, configuration parameters for performing federated training of a machine learning model using data stored in the plurality of second silos; generating a federated learning pipeline for automatically executing a plurality of tasks associated with the federated learning of the machine learning model based on the configuration parameters, including automatically generating code, scripts, or both for performing the plurality of tasks for training a local instance of the machine learning model in each respective silo of the plurality of second silos using the data stored in the respective silo, and for providing respective learnable parameters information associated with the local instance of the machine learning model to the first silo while ensuring that data protection and privacy requirements associated with the data used to train the local instance of the machine learning model are satisfied; causing each respective silo of the plurality of second silos to train the local instance of the machine learning model according to the federated learning pipeline; obtaining, at the first silo, the learnable parameters information associated with the local instance of the machine learning model of each silo of the plurality of second silos; and aggregating the learnable parameters information obtained from the plurality of second silos to obtain a primary instance of the machine learning model that has been fine-tuned according to the learnable parameters information.

An example method implemented in a data processing system for performing federated learning of a machine learning model includes receiving, in a first silo, configuration parameters for performing federated training of the machine learning model using data stored in the plurality of second silos; generating a federated learning pipeline for automatically executing a plurality of tasks associated with the federated learning of the machine learning model based on the configuration parameters, including automatically generating code, scripts, or both for performing the plurality of tasks for training a local instance of the machine learning model in each respective silo of the plurality of second silos using the data stored in the respective silo, and for providing respective learnable parameters information associated with the local instance of the machine learning model to the first silo while ensuring that data protection and privacy requirements associated with the data used to train the local instance of the machine learning model are satisfied; causing each respective silo of the plurality of second silos to train the local instance of the machine learning model according to the federated learning pipeline; obtaining, at the first silo, the learnable parameters information associated with the local instance of the machine learning model of each silo of the plurality of second silos; and aggregating the learnable parameters information obtained from the plurality of second silos to obtain a primary instance of the machine learning model that has been fine-tuned according to the learnable parameters information.

An example machine-readable medium on which are stored instructions. The instructions when executed cause a processor of a programmable device to perform operations of receiving, in a first silo, configuration parameters for performing federated training of a machine learning model using data stored in the plurality of second silos; generating a federated learning pipeline for automatically executing a plurality of tasks associated with the federated learning of the machine learning model based on the configuration parameters, including automatically generating code, scripts, or both for performing the plurality of tasks for training a local instance of the machine learning model in each respective silo of the plurality of second silos using the data stored in the respective silo, and for providing respective learnable parameters information associated with the local instance of the machine learning model to the first silo while ensuring that data protection and privacy requirements associated with the data used to train the local instance of the machine learning model are satisfied; causing each respective silo of the plurality of second silos to train the local instance of the machine learning model according to the federated learning pipeline; obtaining, at the first silo, the learnable parameters information associated with the local instance of the machine learning model of each silo of the plurality of second silos; and aggregating the learnable parameters information obtained from the plurality of second silos to obtain a primary instance of the machine learning model that has been fine-tuned according to the learnable parameters information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flow diagram of a process for federated learning of a machine learning model.

DETAILED DESCRIPTION

Figure 1A:
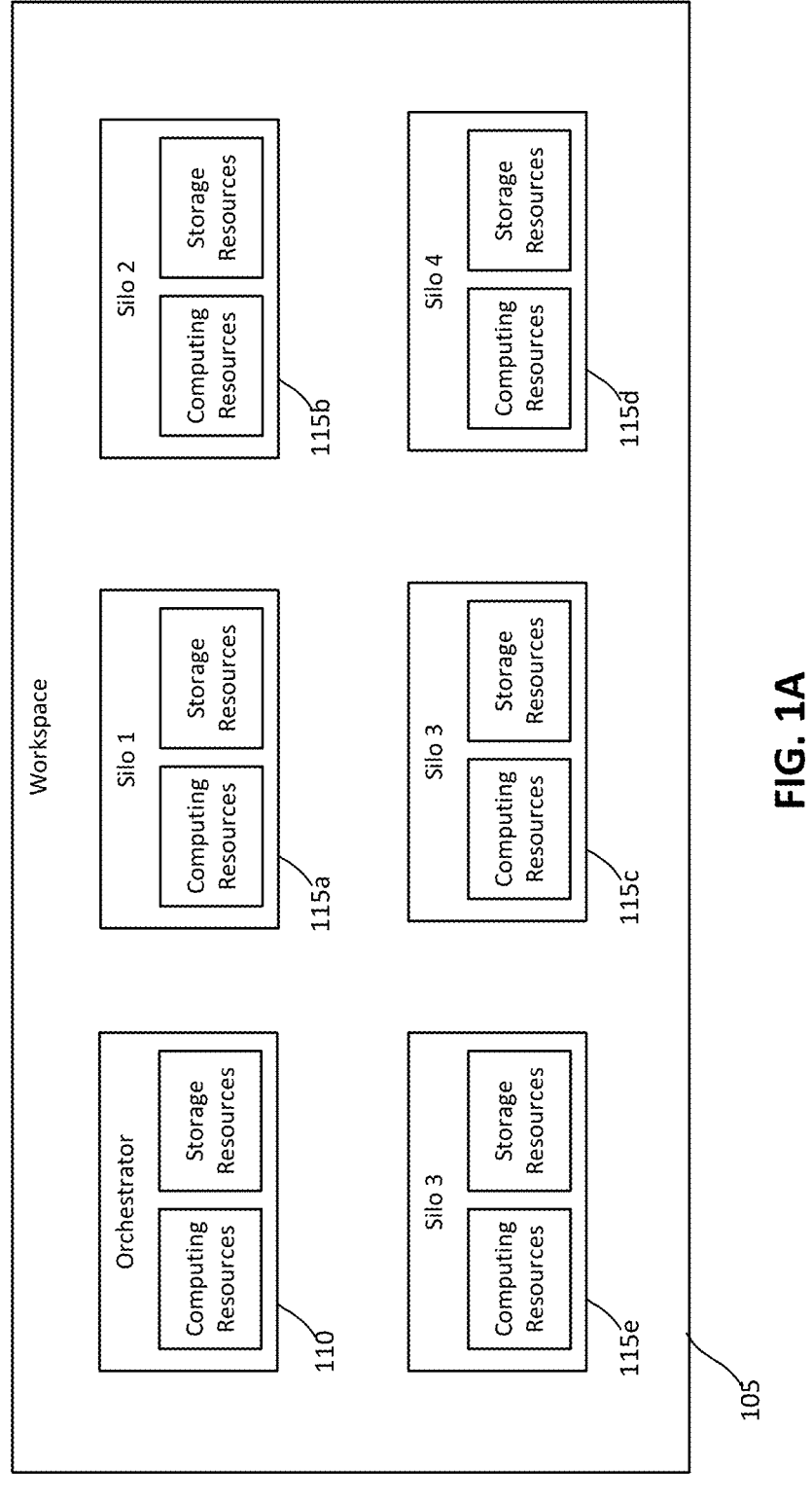
FIGS. 1A and 1B are diagrams showing two example computing environments in which the techniques provided herein may be implemented

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for federated machine learning are provided that solve the technical problem of training ML models on data distributed among multiple locations without requiring that the data be collected at a centralized location for analysis. A technical benefit of these techniques is that the data of the datasets used to train the model is analyzed locally on the computing environments on which the data is stored. The data is not collected at a centralized location, thereby ensuring that the data protection and privacy requirements associated with the various datasets are met. These requirements are met by implementing an orchestrator that is configured to coordinate the federated training of an ML model with "silos" that have access to a respective portion of the data to be used for training the ML model. The data in each silo is segregated from the data of the other silos, and each silo is allocated computing and storage resources for storing the data and performing various computational tasks on the data. The orchestrator coordinates the federated training with the silos by providing the silos with learnable parameters information which may include initial model weights, biases, and/or other parameters associated with the ML model. The learnable parameters information are parameters used by nodes within the hidden layers of the ML network to transform data that has been input into the network to generate a prediction based on that network. Each silo conducts training on a local instance of the ML model using locally available data. The silos then provide the updated learnable parameters information to the orchestrator, which aggregates the model weights received from each of the silos to update a primary version ML model maintained by the orchestrator. A technical benefit of the federated machine learning techniques discussed herein provides privacy protections that ensure that in one implementation only the learnable parameters information can be exchanged between the orchestrator and the silos. The data associated with each of the silos used to train the ML is never disclosed outside of the silos, thereby preserving the data independence of the silos, and ensuring that the data protection and privacy requirements associated with the datasets of the silos are met.

The techniques provided herein significantly simplify the training of an ML model using federated learning. The orchestrator provides a user interface that simplifies the process of generating, maintaining, and deploying a federated learning pipeline for training an ML model. The user interface provides means for easily navigating the federated learning pipeline and adding, modifying, and removing stages of the federated learning pipeline. The user interface enables the user to easily configure the hyperparameters for the ML model being trained and/or other configuration parameters for the federated learning process. The hyperparameters may define how many epochs of training will be performed during the training of the ML model. An epoch represents a complete pass through all the training samples included in the training dataset being used to train the model. The hyperparameters may also define a batch size indicating a specified number of training samples to from the training dataset that are to be processed in an iteration of training. The orchestrator considers these hyperparameters when generating the federated learning pipeline and automatically adds a specified number of training iteration stages to the federated pipeline based on the size of the dataset to be used to train the ML model, the batch size, and the number of epochs desired. In the past, complex code and/or scripts would have been manually written by a data scientist or others to define the workflow of the training process. The federated learning techniques described herein provides a technical solution to this problem by automating much of this process by automatically generating the workflow of the federated learning pipeline based on these parameters. The orchestrator is configured to automatically generate the federated learning pipeline based in part on the hyperparameters designated for the ML model being trained and/or other configuration parameters, such as those discussed below.

The orchestrator also considers other configuration parameters when generating the federated learning pipeline. In some implementations, the configuration parameters includes information identifying each of the silos in which training of a local instance of the ML model is to be conducted, an amount of computing resources and/or storage resources to be allocated by the silo for training a local instance of the ML model, the input data source or data sources to be used by each silo for training the local instance of the ML model, and other parameters for configuring how the local instance of the models are to be trained by the silos. In some implementations, the configuration parameters may also include information indicating the types of preprocessing and postprocessing that may be performed by the orchestrator and/or by the silos at each stage of the federated learning pipeline.

The orchestrator further simplifies the training process by automatically generating much of the code and/or scripts for implementing the federated learning on the orchestrator and the silos. The code and/or scripts that may be customized to satisfy the requirements of the machine learning model being trained. The automated code and/or scripts define how to deploy the learnable parameters information, such as the model weights, biases, and/or other parameters, are to be deployed to each of the silos in which ML model is to be trained, for settings up the computing and storage resources for training the instance of the model in each of the silos, for retrieving the training data from the respective data store or data stores associated with each silo, for performing the training on a local instance of the ML model in each silo, and for providing the learnable parameters information from each local instance of the ML model from the silos back to the orchestrator. All these operations would have required a large number of complex code and/or scripts be manually generated by the data scientists or other users implementing the federated learning of the ML model.

The user interface provided by the orchestrator for creating and generating the federated learning pipeline, and the automated generation and deployment of code and/or scripts to the silos significantly reduces the chances that the user may introduce a configuration error into the training process that would require the federated learning process to be rerun to correct these errors. Consequently, the amount of memory, computing resources, and/or network resources consumed by the orchestrator and the silos may be significantly reduced by eliminating such errors.

Another technical benefit of the techniques provided herein is that federated learning pipeline is not static, and the orchestrator can dynamically update the flow the federated learning pipeline during the training of the ML model. In some implementations, the orchestrator evaluates the performance of the ML model while the federated learning pipeline is being executed to determine whether the performance of the model satisfies certain conditions that indicate whether the model requires additional training. The orchestrator adds additional training iteration stages to the federated learning pipeline, modifies existing training iteration states of the federated learning pipeline, or removes existing training iteration states of the federated learning pipeline in response to the performance of the model. The orchestrator may also dynamically alter the flow of the federated learning pipeline in response to user-specified criteria. The orchestrator may add additional stages to the federated learning pipeline, modify existing stages of the federated learning pipeline, or delete stages from the federated learning pipeline in response to the user-specified criteria being satisfied. This approach allows the orchestrator to adapt the training of the ML model while the training is being performed. Consequently, the number of training sessions required to train the ML model may be reduced, thereby reducing the computing, memory, and network resources required to train the ML model.

The federated learning pipeline provides a significant improvement over current approaches to machine learning pipelines which are typically static, very complex, and require a significant amount of manual intervention to build and maintain the machine learning pipeline. Furthermore, the techniques provided herein can significantly reduce the memory, computing resources, and/or network resources associated with implementing and performing the federated learning across the silos. These and other technical benefits of the techniques disclosed herein will be evident from the discussion of the example implementations that follow.

Figure 1B:
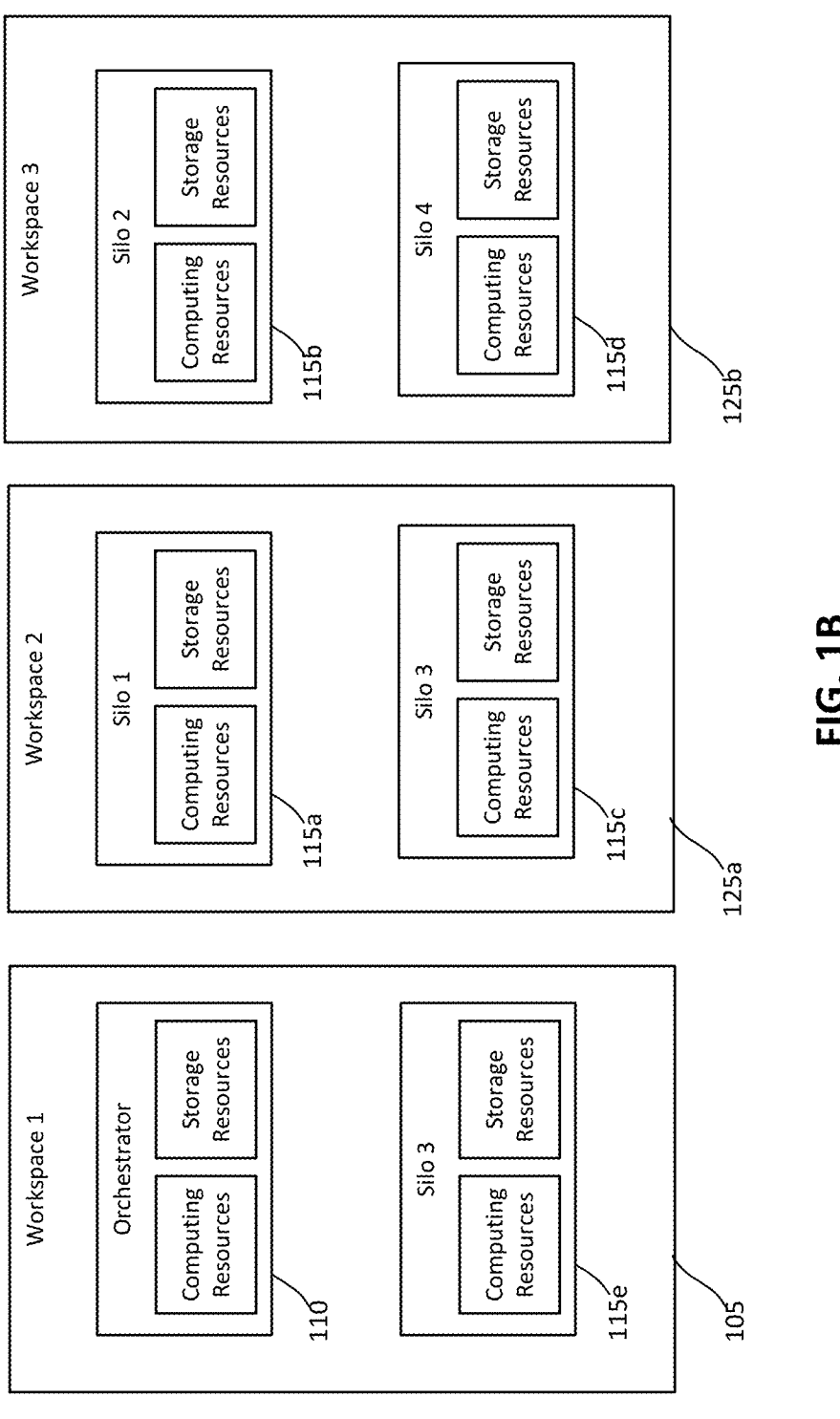

FIGS. 1A and 1B are diagrams showing two example computing environments in which the techniques provided herein may be implemented. The orchestrator 110 is configured to coordinate with the silos 115a, 115b, 115c, 115d, and 115e (collectively referred to as a silo 115) to implement the federated learning techniques described herein. The orchestrator 110 and each of the silos 115a, 115b, 115c, 115d, and 115e are allocated computing and storage resources in the respective cloud-based environment in which the orchestrator 110 and the silos 115a, 115b, 115c, 115d, and 115e. The orchestrator 110 and all the silos in the example shown in FIG. 1A are associated with a single workspace 105. In contrast, the orchestrator 110 and the silos 115a, 115b, 115c, 115d, and 115e are associated with multiple separate workspaces in the example shown in FIG. 1B. In FIG. 1B, the orchestrator 110 and silo 115e are associated with the workspace 105, silos 115a and 115c are associated with a second workspace 125a, and silos 115b and 115d are associated with a third workspace 125b.

A workspace provides a centralized platform for creating, training, managing, and deploying machine learning models to computing environments, such as the silos 115a, 115b, 115c, 115d, and 115e. The workspace may be implemented using a Microsoft Azure Machine Learning® workspace. Other implementations using another type of workspace associated with another machine learning platform. The workspace may maintain a history of training runs of the ML models associated with the workspace, which may be used by a data analyst to determine whether the ML models are performing as desired and to keep track of the training that has been performed thus far on the ML models. The history may include various information, including but not limited to logs, metrics, output, and a snapshot of the scripts used in the training. The history information may be used to determine training that produces the best ML model to satisfy a particular objective.

The workspace may also facilitate deployment of an ML model to various computing environments in which the predictions output by the model may be utilized, such as but not limited to the silos 115a, 115b, 115c, 115d, and 115e. The model may be deployed to other silos that were not involved in the training of the model based upon business or operational needs. The resources onto which the ML model may be deployed are referred to herein as a "compute target" and the workspace may support multiple different types of compute targets. The compute targets may include but are not limited to containers, a Kubernetes cluster, and a Hypertext Transfer Protocol (HTTP) endpoint. A container provides a secure means for packaging, deploying, and managing cloud-based applications. The container includes the executable application code and supporting services. Containers may provide a more lightweight and flexible solution that using virtual machines, which are often used to implement applications in cloud-based computing environments. A Kubernetes cluster is a set of nodes, such as the computing resources allocated to a silo, that may be configured to run containerized applications. An HTTP endpoint provides a means for accessing resources in a cloud-based environment. The HTTP endpoint may define a base Uniform Resource Locator (URL) for submitted requests to the HTTP endpoint. Other implementations may facilitate deploying the machine learning model to other types of compute targets.

A workspace may provide tools that facilitate running experiments, creating pipelines, and managing datasets. Experiments may be set up to conduct training runs used to build an ML model. Pipelines are reusable workflows in which a user may define and/or manage a reusable workflow for training and/or retraining the ML model. The workspace also may include tools for managing the data that is used for training the model and for creating the pipelines for using the data to train and/or retrain the ML models. As will be discussed in greater detail in the examples which follow, the orchestrator 110 coordinates the implementation of these experiments with other computing environments, such as the silos 115a, 115b, 115c, 115d, and 115e. The orchestrator 110 may also provide tools for creating, maintaining, and executing a federated learning pipeline that automates and/or significantly simplifies many of the tasks associated with conducting the experiments to train ML models.

A workspace may be associated with one or more silos, such as the silos 115a, 115b, 115c, 115d, and 115e shown in FIGS. 1A and 1B. The orchestrator 110 is configured to maintain a primary version of one or more ML models to be trained using the federated training techniques described herein. At least a portion of the data to be used to train the ML models may be present in the silos 115a, 115b, 115c, 115d, and 115e. The orchestrator 110 may coordinate federated training with each of the silos 115a, 115b, 115c, 115d, and 115e whether the silo is associated with the same workspace or with a different workspace than the orchestrator 110. The silos 115 may be associated with different workspaces due to data protection and/or data privacy requirements imposed by a jurisdiction in which the silos are located. The silos 115 may also be associated with different organizations that may have a common interest in developing a machine learning model for a particular purpose but cannot or do not want to disclose the data to another organization. The orchestrator 110 may be able to automatically execute jobs on the computing resources of silos 115 that are associated with the same workspace as the orchestrator 110. However, additional steps may need to be taken to permit the orchestrator 110 conduct federated learning operations with silos 115 that are associated with a different workspace than the orchestrator. Code signing and policy controls may be implemented to facilitate federated learning with the silos 115 associated with a different workspace. These features will be discussed in greater detail in the examples which follow.

The data in the silos 115 may be subject to various types of data protection and privacy requirements. As discussed above, certain jurisdictions may impose data protection and privacy laws that prohibit and enterprise or other organization from disclosing customer data. These data protections may extend to but are not limited to financial data, medical data, employment data, and other types of sensitive information. Organization or enterprises may also impose data protection and privacy rules for how sensitive data may be handled. These data protections may extend to but are not limited to research data, financial data, membership data, business plans, customer or member information, and other types of data are valuable to the organization or enterprise. The organization or enterprise information may also be subject to protection under the data protection and privacy laws.

One approach to access policy controls is to implement access control policies which identify which information cannot be shared with the orchestrator 110 by the silos 115. In such implementations, any data that is not expressly prohibited from being shared by the access control policy may be shared with the orchestrator 110. In some implementations, the silos 115 may be associated with a workspace, and the workspace may implement access control policies that define who may access the data in the silos 115 associated with the workspace, the actions these users may perform on this data, and whether the data may be exported from the silo 115 to other silos associated with the workspace or to other silos not associated with the workspace. In other implementations, each silo 115 implement silo-level access control policies that define who may access the data in the silo 115, the actions these users may perform on this data, and whether the data may be exported from the silo 115. In such implementations, any data that is not expressly prohibited from being shared by the access control policies may be shared with the orchestrator 110.

In a second approach to access policy controls, the access control policies, whether implemented at the workspace level or the silo level, may be configured to expressly identify the data that may be shared with the orchestrator 110 by the silo 115 to specific data. No data not expressly identified by the access control policies may be shared with the orchestrator 110. In some implementations, the data that may be shared with the orchestrator 110 may be limited to learnable parameter information associated with local instances of the ML model being trained in a silo. The access control policies may also permit metadata associated with the training of the local instance of the ML model to be shared with the orchestrator 110. This metadata may include information indicating whether the training of the local instance of the ML model was successful, how long the training of the local instance of the ML model took to complete, information indicating when the training of the local instance was initiated and when the training was completed, information identifying error conditions that prevented the training of the local instance of the ML model from being completed.

As discussed in the examples which follow, the orchestrator 110 automatically generates scripts and/or code to implement a federated learning pipeline and provides those scripts and/or code to each of the silos 115 in which the ML model is to be trained. The scripts and/or code can implement the access control policies of the silo 115 in which the scripts and/or code is being executed to train a local instance of the ML model.

The orchestrator 110 may provide a user interface for creating, maintaining, and/or executing the federated ML pipelines. The user interface may automate many of tasks that would formerly be manual and labor-intensive processes. The orchestrator 110 may store the primary versions of the ML models being developed, pipeline information for the federated learning pipelines for training these ML models, and other data related to implementing the federated learning for the ML models in the storage resources allocated to the orchestrator 110. The federated ML pipeline user interface may access and/or update this information stored in the storage resources allocated to the orchestrator 110. Examples of the user interface and the functionality that may be provided by this user interface are described in detail in the example which follow.

The orchestrator 110 may also be configured to facilitate setting up new workspaces and/or updating the access control policies for workspaces external to the workspace 105 with which the orchestrator 110 is associated.

The following scenarios demonstrate where the implementations shown in FIGS. 1A and 1B may be utilized. In a first scenario based on the implementation shown in FIG. 1A, Corporation A is an international corporation that is present in multiple countries, each of these countries is associated with a silo from the silos 115a, 115b, 115c, 115d, and 115e. Alice is a data scientist working for the sales department of Corporation A and is developing a machine learning model for forecasting sales based on the customer data. Each of the data stores represented by silos 115*a*, 115*b*, 115*c*, 115*d*, and 115*e* is associated with the same workspace 105 as the orchestrator 110 in this example. Therefore, the orchestrator 110 is permitted to launch jobs associated with the federated learning processes described herein on the computing resources of the silos 115*a*, 115*b*, 115*c*, 115*d*, and 115*e*. In a second scenario based on the implementation shown in FIG. 1B, Ben is a data scientist at Corporation A in the auditing department and is developing a machine learning model for detecting anomalies in customer accounting data. In this example implementation, the silos 115*a* and 115*c* are associated with customer data for a first customer, and the silos 115*b* and 115*d* are associated with a second customer. The data in the silos 115*a*, 115*b*, 115*c*, and 115*d* cannot be copied from their respective silos due to privacy and protection laws and/or customer requirements for data privacy and protection. Consequently, the silos 115*a* and 115*c* associated with the first customer are associated with the workspace 125*a*, and the silos 115*b* and 115*d* are associated with the workspace 125*b*. The data in silo 115*e* is associated with Corporation A and falls within the same workspace 105 as the orchestrator 110. Therefore, the orchestrator 110 can launch jobs associated with the federated learning processes described herein on the silo 115*e*. However, additional policy considerations are involved with launching jobs in the silos 115*a*, 115*b*, 115*c*, and 115*d* which are associated with the separate workspaces 125*a* and 125*b*, respectively. As will be discussed in greater detail in the examples which follow, administrators of the workspaces 125*a* and 125*b* may permit the orchestrator 110 to launch jobs on the workspaces 125*a* and 125*b* through policy controls. The security and integrity of the data stores of the silos 115*a*, 115*b*, 115*c*, and 115*d* may also be ensured through code signing and other processes to ensure that any software executed by the computing resources of the silos 125*a* and 125*b* originates from a trusted source.

The following scenario illustrates another instance in which the federated learning techniques provided herein may be implemented in an environment in which one or more of silos 115 are in which data to be used to train the ML model is associated with a different workspace that the orchestrator 110. In this example, a consortium of research hospitals are developing an ML model for predicting the efficacy of certain therapies in treating the symptoms associated with a particular disease. Each of the hospitals have their own silos 115 that include patient treatment data but none of the hospitals may disclose patient-specific information to the other hospitals. The orchestrator 110 may be implemented by one of these hospitals and is configured to coordinate the federated learning with the silos 115 of the other hospitals. The orchestrator 110 may maintain a primary version of the ML model. The orchestrator 110 may provide the learnable parameters information, such as the model weights, biases, and/or other parameters, of the primary ML model to each of the silos and the silos may each train a local instance of the ML model using the respective patient data for that hospital. Once the local copies have been trained, each silo 115 may provide the updated learnable parameters information to the orchestrator 110 for aggregation. The aggregated weights, biases, and/or other parameters may then be used to update the weights, biases, and/or other parameters of the primary ML model maintained by the orchestrator 110. The training process may include multiple iterations of federated training to further fine-tune the performance of the ML model.

Figure 2:
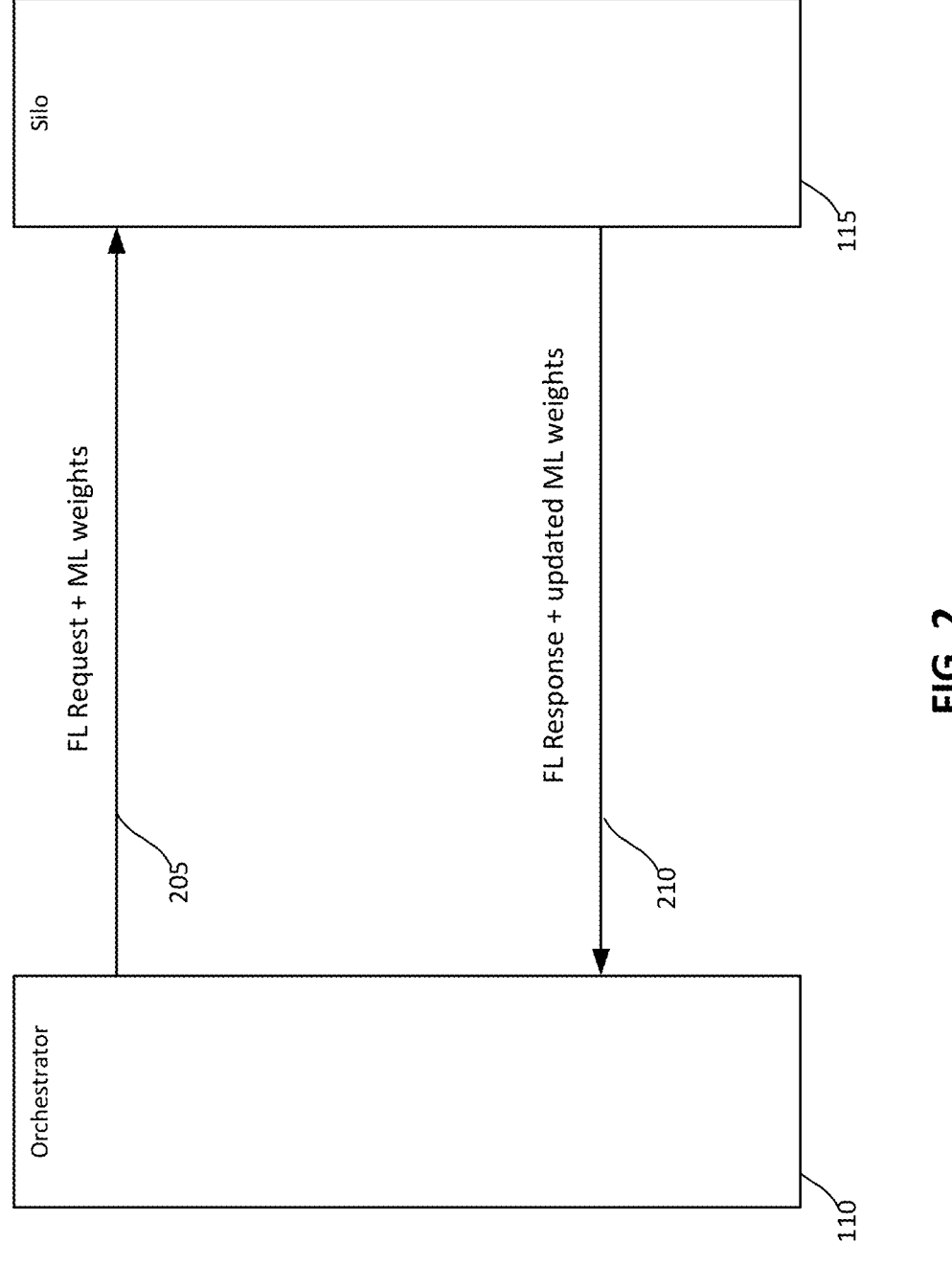
FIG. 2 is a diagram that shows, at a high level, the types of data that may be exchanged between the orchestrator and a silo during an iteration of a federated learning session according to the techniques provided herein.

FIG. 2 is a diagram that shows, at a high level, the types of data that may be exchanged between the orchestrator 110 and a silo 115 during an iteration of a federated learning session according to the techniques described herein. The orchestrator 115 may send a federal learning request 205 to the silo 115. The federated learning request 115 may include machine learning weights associated with a pretrained machine learning model that is to be fine-tuned using federated learning. The federated learning request 115 may trigger the silo to execute code configured to cause the silo to instantiate a local instance of the ML model on the computing resources of the silo 115, to train the local instance of the model using relevant private data maintained in the storage resources of the silo 115, and/or perform other operations associated with the federated learning techniques provided herein. The silo 115 may very whether the orchestrator 115 is part of the same workspace and authenticate the request prior to execution as discussed in the examples which follow. Once the silo 115 has completed the requested operations, the silo 115 may provide a federated learning response 210 to the orchestrator 110 that includes the updated weights of the local instance of the ML model. The silo 115 may also provide system metadata associated with the training of the ML model that may be used by the orchestrator 110 for reporting purposes. The system metadata does not include any customer-specific information that may be associated with a particular customer. Instead, the metadata may include high-level information, such as the number of customers whose data were included in the data set used to fine-tune the ML model, the data ranges associated with records processed, and/or other information that may be useful for reporting purposes. For example, metadata information may be useful to a data analyst for assessing the performance of the model and for determining a training strategy for further fine-tuning the model should further fine-tuning be necessary. The orchestrator 110 may compare the performance of the ML model to one or more performance criteria to determine whether to additional iterations of training may be necessary. The example operations shown in FIG. 2 may be performed by the orchestrator 110 and the each of silos 115 that include data to be used for fine-tuning the training of the ML model.

Figure 3A:
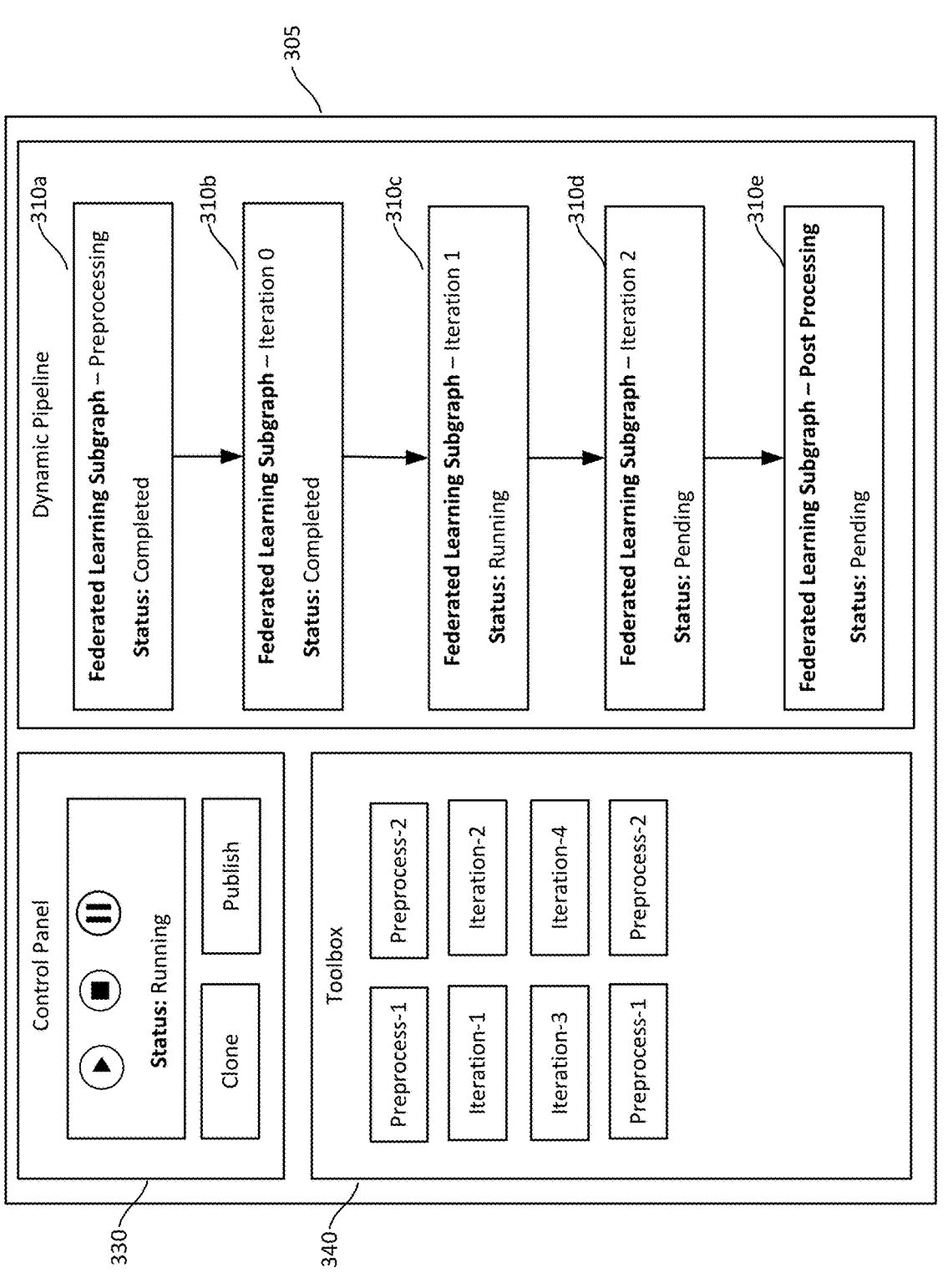
FIGS. 3A and 3B are diagrams of example user interfaces that may be provided by the orchestrator shown in FIGS. 1 and 2.
Figure 3B:
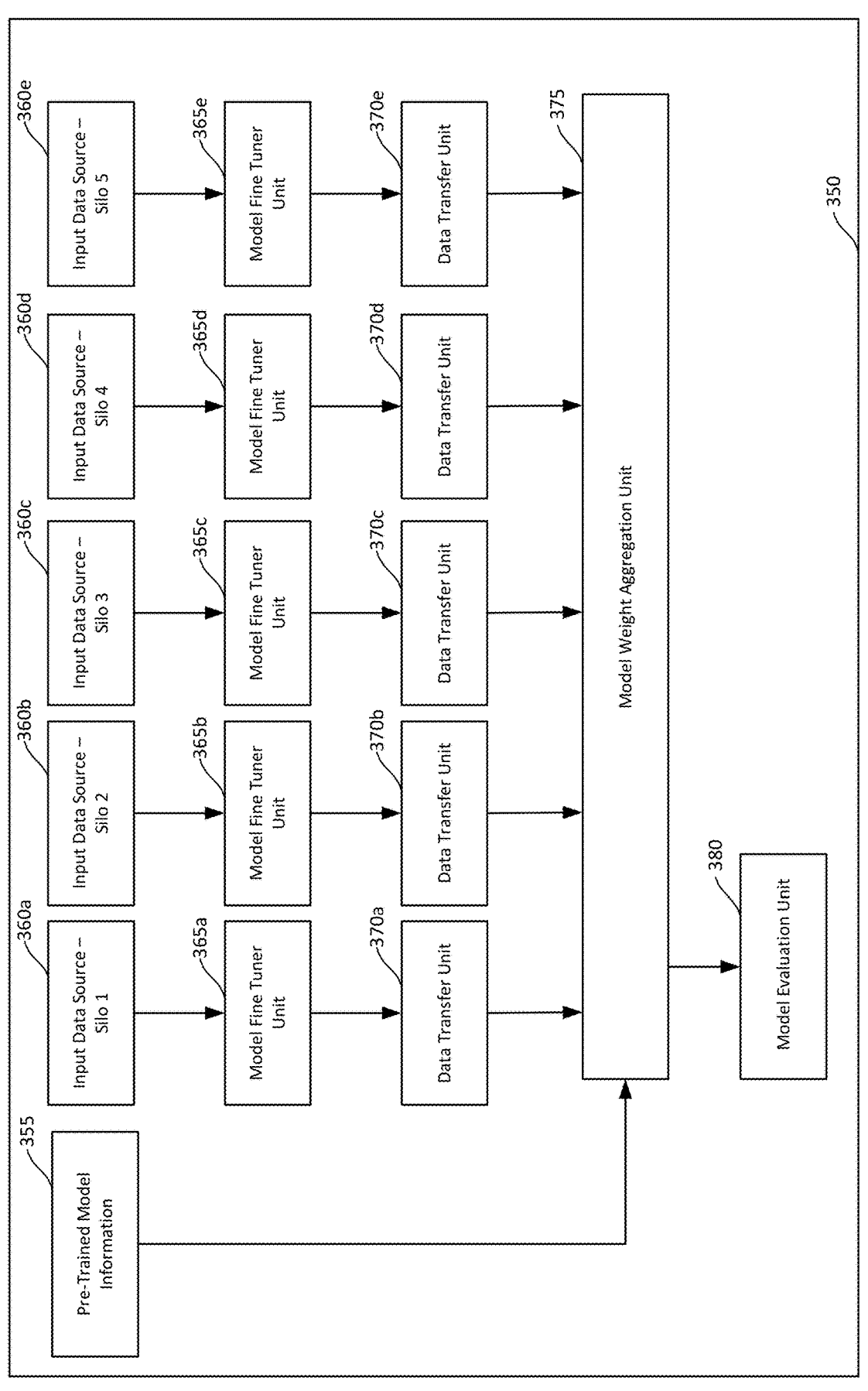

FIGS. 3A and 3B are diagrams of example user interfaces that may be provided by the orchestrator 110. The user interface 305 is an example of a user interface for building a federated learning pipeline for implementing federated learning. The user interface 305 provides means for dynamically defining a federated learning pipeline and/or modifying a federated learning pipeline. The federated learning pipeline may be a dynamic federated learning pipeline that has been automatically generated by the orchestrator from configuration parameters associated with the federated learning pipeline. As discussed in the preceding examples, the configuration parameters may include hyperparameter information for the ML model for which the federated learning is being performed. The configuration parameters may also include information identifying each of the silos in which training of a local instance of the ML model is to be conducted, an amount of computing resources and/or storage resources to be allocated by the silo for training a local instance of the ML model, the input data source or data sources to be used by each silo for training the local instance of the ML model, and other parameters for configuring how the local instance of the models are to be trained by the silos. The configuration parameters may also include information indicating the types of preprocessing and postprocessing that may be performed by the orchestrator and/or by the silos at each stage of the federated learning pipeline. The user interface 305 may provide means for the user to view, create, and/or modify the configuration parameters for generating the ML pipeline. The orchestrator 110 may use this information to generate a new federated training pipeline or modify an existing federated learning pipeline. As discussed in the preceding examples, the orchestrator 110 may automatically generate scripts and/or code for implementing the various stages of the federated leaning pipeline based at least in part on the configuration parameters. The orchestrator 110 may be configured to push the code and/or scripts to each of the silos participating in the training of an ML model.

In the user interface 305, the user may add stages to the federated learning pipeline, delete stages from the pipeline, and/or modify the parameters of the stages of the pipeline. In some implementations, the user interface 305 may include a toolbar 340 for selecting and adding stages to the pipeline. The toolbar 340 may provide a drag and drop interface that provides a graphical representation of the types of stages that the user may add to the federated learning pipeline. The user may also click on or otherwise select a stage of the federated pipeline to view and/or modify the parameters for that stage of the pipeline. The user interface 305 may also include controls 330 that enable the user to initiate, pause, and/or stop the federated learning process defined by the pipeline. The orchestrator 110 may also authenticate the user to determine whether the user is permitted to utilize the orchestrator 110 to create, modify, or execute the federated learning pipeline.

In the example shown in FIG. 3A, the federated learning pipeline includes five stages 310a-310e to demonstrate some of the types of stages that may be included in the federated learning pipeline. Each stage is associated with a status: pending, running, or completed. The completed status indicates that the operations associated with the stage of the federated learning pipeline have been completed successfully. The running status indicates that the operations associated with the stage of the federated learning pipeline are currently being executed by the orchestrator 110 and/or one or more of the silos 115. The pending status indicates that the stage of the federated learning pipeline has not yet been reached and is pending execution once the preceding stages have been completed.

In the preprocessing stage 310a, the user may define various actions that may be taken to initialize the primary version of the ML model in preparation for the federated training. For example, the primary versional of the ML model may be pretrained using one or more publicly available datasets. The pretraining process may be used to initialize the ML model, which will then be fine-tuned to adapt the model to a particular task using the federated learning process. Furthermore, the preprocessing stage may include data standardization of the data, removal or replacement of null values, and/or other operations to prepare the data to be used for pretraining the model. The specific preprocessing operations to be performed may depend upon the types of data to be processed by the model. The user may click on or otherwise activate the stage 310a to cause the orchestrator 110 to display details of the preprocessing stage which may be configured by the user. The user may specify the computing and storage resources of the orchestrator 110 to be used for executing the preprocessing stage. The user may identify one or more training data sets to be used to pretrain the ML model and may also create or customize one or more scripts or code to be executed to perform the pretraining of the ML model.

The example shown in FIG. 3A also includes training iteration stages 310b, 310c, and 310d which each represent an iteration of the federated training process being applied to ML model. Each iteration represents a set of operations that are performed by the orchestrator 110 and the respective silos 115 on which the federated learning for the ML model will take place. A local instance of the ML model will be trained by each silo 115 using a batch of training data locally available in the storage resources of that silo 115. The batch size may be equal to the full set of training data or may be a subset of the full set of training data available in the silo 115. For example, if the training data includes 10,000 training examples and the batch size is 5,000 training examples, it would take the two iterations for the ML model to be trained on the entire batch of training examples. The number of training examples and the batch size may vary depending upon the size of the datasets included in each of the silos 115. In some implementations, the orchestrator 110 may be configured to query each of the silos 115 for a count of the number of records available for each silo and to determine a recommended number of iterations based on the batch size. The orchestrator 110 may add the recommended number of iterations to the federated learning pipeline automatically by default. Thus, the orchestrator 110 may add additional stages to the federated learning pipeline to accommodate the recommended number of iterations. However, the user may be provided with an option to increase or decrease the number of training iteration stages included in the pipeline by deleting training iteration stages that have automatically been added to the pipeline by the orchestrator or by manually adding in additional training iteration stages. The training iteration stage may also permit the user to define additional information, such as the location of the compute and storage resources of the silos 115 that include data on which the model is to be trained. FIG. 3B provides an example user interface 350 that presents details of the operations that may be performed during a training iteration stage. The training iteration stages that are added either automatically by the orchestrator 110 manually by the user may be automatically populated with the configuration parameters, executable scripts and/or code, and other information for implementing the training iteration stages of the federated training pipeline.

The training iteration stages 310b, 310c, and 310d may also be associated with one or more completion conditions, which when satisfied, indicates that the ML model has been trained to reach a desired performance threshold. The orchestrator 110 may evaluate the completion conditions to determine whether additional iterations of federated training are necessary. The orchestrator 110 may then continue with additional training stage as necessary or proceed to the next stages of the federated training pipeline.

The postprocessing stage 310e may perform various operations on the machine learning model resulting from the previous stages of the federated learning pipeline. The postprocessing stage 310e may include updating the weights of the primary instance of the ML model maintained by the orchestrator 110. The postprocessing stage 310 may also include deploying the updated ML model to a compute environment of one or more silos 115 and/or other computing environments for use in generating predictions for the purpose for which the ML model has been trained. Other operations in addition to or instead of one or more of these example operations may be performed in the postprocessing stage 310e.

FIG. 3B provides an example user interface 350 that presents details of the operations that may be performed during a training iteration stage. The user interface 350 may be presented when the user clicks on or otherwise activates a training iteration stage of the federated learning pipeline shown FIG. 3A. The user interface 350 may present a graphical representation of various inputs to the federated learning process and the operations that are performed on those inputs during a training iteration stage, such as the training iteration stages 310b, 310c, and 310d shown in FIG. 3A. The graphical representation may be presented as a flowchart that shows how the data flows from operation to operation within the training iteration stage and how the results of the training iteration stage are evaluated and utilized by the orchestrator 110 to determine whether the training of the ML model should continue or has reached a desired performance threshold.

The pre-trained model information 355 represents the model weights from a version of the primary ML model maintained by the orchestrator 110. The pre-trained model 355 may be an initial version of the pre-trained model that is generated by the preprocessing stage 310a or by a previous training iteration stage, such as stages 310b or 310c shown in FIG. 3A. The pre-trained model information 355 including the model weights may be viewable by the user by clicking on or otherwise activating the representation of the pre-trained model information 355 shown in the user interface 350. The pre-trained model information 355 may include version information for the model that identifies the version being trained and an indication of the current stage of the training being performed of the federated training pipeline shown in FIG. 3A. Some of the pre-trained model information 355 may not be available until the training iteration stage within the federated training pipeline is reached and is pending or completed.

The input data source 360a represents the data associated with the silo 115a to be used for training the model. The input data source 360b represents the data associated with the silo 115b to be used for training the model. The input data source 360c represents the data associated with the silo 115c to be used for training the model. The input data source 360d represents the data associated with the silo 115d to be used for training the model. The input data source 360e represents the data associated with the silo 115e to be used for training the model. The input data sources 360a, 360b, 360c, 360d, and 360e are collectively referred to as input data source 360. Each respective silo works trains a local version of the ML model using the respective private data included in the data sources 360. The data in each of the input data sources 360 remains within its respective silo during the federated training process and is not disclosed outside of the silo boundaries. While the example shown herein includes five input data sources 360, the number of input data sources 360 may vary from implementation to implementation depending upon the number of sources from which a particular ML model is to be trained.

The user interface 350 may provide various means for adding the input data sources 360. In some implementations, the user interface 350 may include a button or other control, which when activated, permits the user to define a new data source that includes data on which the ML model is to be trained. The user interface 350 may provide means for inputting information identifying the compute and storage resources allocated to the silo in which the model is to be trained is located. In some implementations, the user interface 350 may present the user with a default configuration file, such as a YAML file, which may be customized with the compute location and storage location associated with the silo. In other implementations, the user interface prompts the user for this information and generate the configuration file for the user automatically. The configuration file may be provided to the silo with the federated learning request 205 to the respective silo 115 associated with the respective input data source 360 so that the model fine tuner 365 operates on the correct data source. In some implementations, the configuration file specifies whether all or a subset of the data included in the respective input data source 360 is to be used for training the ML model instance. In some implementations, the user interface 350 may provide means for the user to define identify which data from the input data source 360 should be used when training the model.

Each input data source 360 is associated with a respective model fine tuner 365. The model fine tuner 365 is configured to instantiate and train a local instance of the ML model using data from the input data source 360 for the silo in which the training is being performed. The model fine tuner 360 instantiates a local instance of the ML model based on the weights provided in the pre-trained model information 355. In some implementations, the model fine tuner 365 is implemented using an interpreted language, such as but not limited to Python, that defines the actions that may be performed on the data for fine tuning the model. The logic implemented in each of the model fine tuners 365a, 365b, 365c, 365d, and 365e may be substantially the same. Each model fine tuner 365 may utilize the configuration parameters associated with the respective data source 360 to determine the data source and the computing resources to be used for fine-tuning the local instance of the ML model. The model fine tuner 365 may be executed by the computing resources allocated to the respective silo 115 and logically isolated to prevent the model fine tuner 365 from exporting any data outside of the silo 115 or accessing any memory outside of defined memory locations used to store the data to be used for training the model.

Upon completion of the training of the ML model by the model fine tuner unit 365, the model fine tuner 365 provides the weights resulting from the fine-tuning of the model to the respective data transfer unit 370 of the data transfer units 370a, 370b, 370c, 370d, and 370e associated with the silo 115. The data transfer unit 370 is configured to send the federated learning response 210 to the orchestrator 110 with the updated ML model weights of the local version of the model generated by the model fine tuner 365. The federated learning response may include status information related to the training process, such as error conditions that may have occurred during the training process. The error condition indicates that the fine-tuning of the local instance of the model could not be completed for operations associated with a stage which failed. The orchestrator 110 determines whether to halt the current iteration of the federated training process or to attempt to resubmit the federated learning request 205 to the respective silo 115 which experienced the error.

The orchestrator 110 implements a model weight aggregation unit 375 and a model evaluation unit 380. The model weight aggregation unit 375 is configured to receive the updated model weights from each of the silos and to execute aggregation logic on the updated model weights to generate an undated version of the primary ML model maintained by the orchestrator 110. In some implementations, the aggregation logic is implemented using a scripting language, such as but not limited to Python. In some implementations, the aggregation logic may average the weights from each of the models to determine the aggregate model weights. However, the user interface 350 may provide means for the user to customize the aggregation logic to satisfy the requirements for the ML model being developed.

The model weight aggregation unit 375 provides the updated ML model to the model evaluation unit 380. The model evaluation unit 380 evaluates the performance of the updated ML model using reference data. The model evaluation unit 380 provides the reference data as an input of the ML model and compares the predictions output by the model with reference output data. The model evaluation unit 380 may be configured to output a result of the evaluation that may be used by the orchestrator 110 to determine how to proceed on the federated learning pipeline. For example, the orchestrator 110 may determine that the model requires additional training and may determine that another iteration of training should be performed. The orchestrator 110 may determine whether the federated learning pipeline shown in FIG. 3A includes a subsequent training iteration stage, such as the training iteration stages 310b, 310c, or 310c. If the orchestrator 110 determines that additional training is required but no subsequent training iteration stages are currently included in the federated learning pipeline, the orchestrator 110 may be configured to dynamically update the federated learning pipeline to include one or more additional iteration stages to further fine tune the ML model while the federated learning pipeline is being executed. A technical benefit of this approach is that the federated learning pipeline can be adapted while the training of the ML model is in progress to avoid the need to modify the federated learning pipeline and restart the training process. Consequently, computing, memory, and network resources may be conserved by avoiding the need to restart the training of the ML model. The user interface 305 and/or 310 may include means for the user to configure the when the orchestrator may add additional training iteration stages and place limits on how many additional iteration stages may automatically be added. These limits prevent the orchestrator 110 from continuing to automatically extend the training of the ML model beyond limits set by the user.

To ensure that data privacy and protection requirements are satisfied, the model fine tuner 365, the data transfer unit 370, and/or other scripts or code to be executed on the respective silos 115 may be digitally signed to ensure that the scripts or code has been provided by the orchestrator 110 and has not been altered or corrupted since the scripts or code was signed. The scripts and/or code may be signed using a private key associated with the orchestrator 110. The silos 115 may verify that the scripts and/or code have not been altered using a public key associated with the orchestrator 110. Each silo 115 may also implement a policy service that is configured to determine whether the orchestrator 110 is permitted to run jobs on the computing resources of the silo 115. The policy service may determine whether the scripts or code were signed, whether the scripts or code are configured to access the datastore resources associated with the respective silo 115 on which they are running, and that only the model weights and/or limited system metadata that does not include any customer-specific information is transferred outside of the silo. If any of the policy conditions are not satisfied, the silo 115 may prohibit the federated learning processes from being executed and/or the resulting data from being provided to the orchestrator 110. The orchestrator 110 may receive an indication from the silo 115 that the federated learning processes cannot be performed. The orchestrator 110 may then alert an administrator that manual intervention may be required to resolve the issues that are preventing the federated learning process from being completed.

Figure 3C:
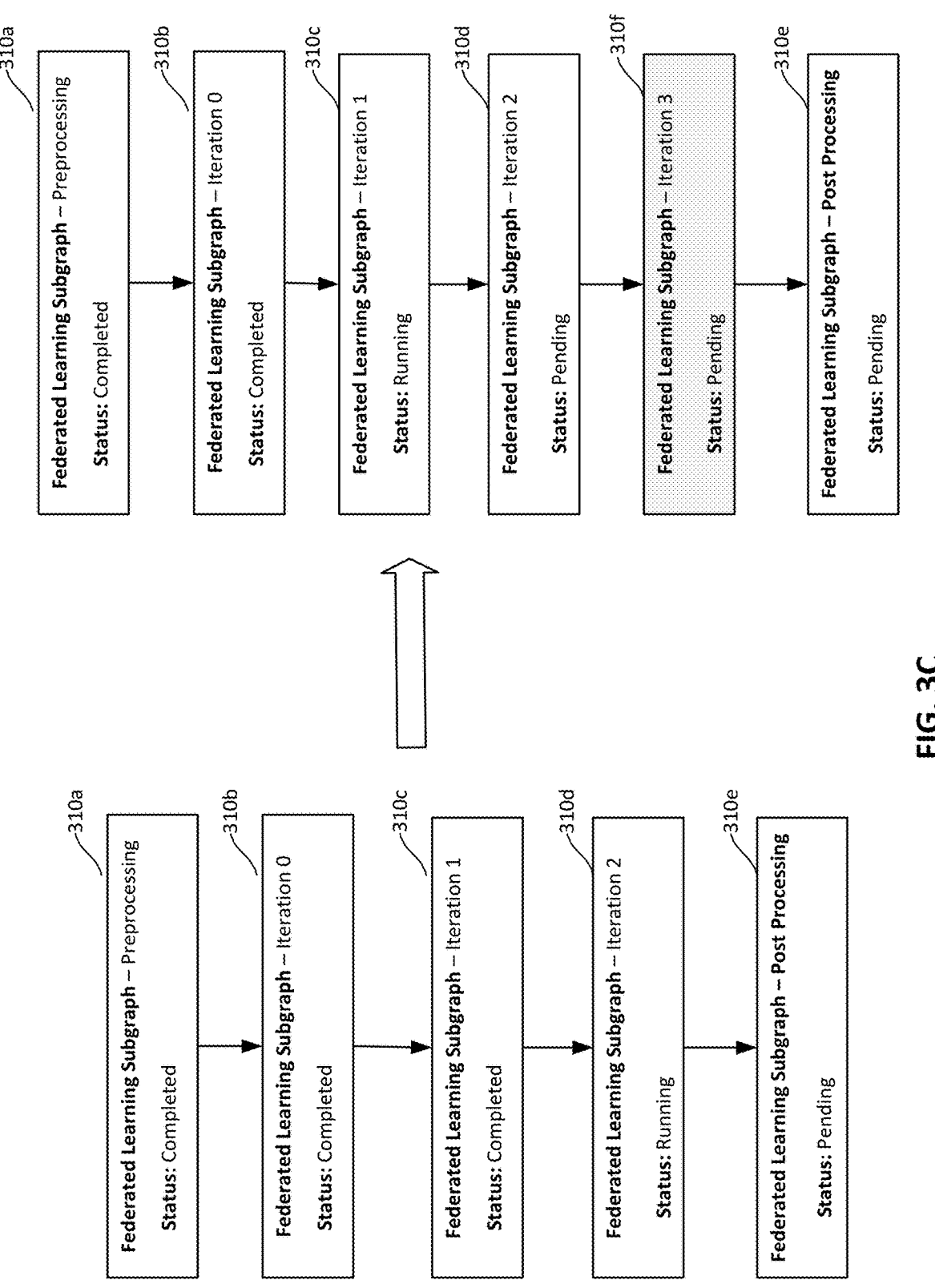
FIG. 3C is a diagram showing an example of the orchestrator dynamically updating the federated learning pipeline shown in FIG. 3A.

FIG. 3C is a diagram showing an example of the orchestrator 110 dynamically updating the federated learning pipeline shown in FIG. 3A. The left side of the figure shows a first state of the federated learning pipeline in which the training iteration stage 310d is currently running and the right side of the figure shows a second state of the federated learning pipeline in which the orchestrator 110 has dynamically updated the pipeline. The model evaluation unit 380 of the orchestrator 110 analyzes the performance of the updated version of the primary ML model generated by the model weight aggregation unit 375 and determines that an additional training iteration stage 310 is necessary to further improve the performance of the primary ML model. The orchestrator 110 is configured to update the federated learning pipeline to include an additional training iteration stage 310f in which additional training is performed on the ML model. The orchestrator 110 is configured to automatically generate the code and/or scripts necessary to perform the additional training iteration stage 310f and to provide the code to the silos 115b, 115c, 115d, and 115e in which the training of the local instances of the ML model is to be performed. The orchestrator 110 may also provide updated configuration parameters to each of the silos 115b, 115c, 115d, and 115e for implemented the updated federated learning pipeline.

Figure 3D:
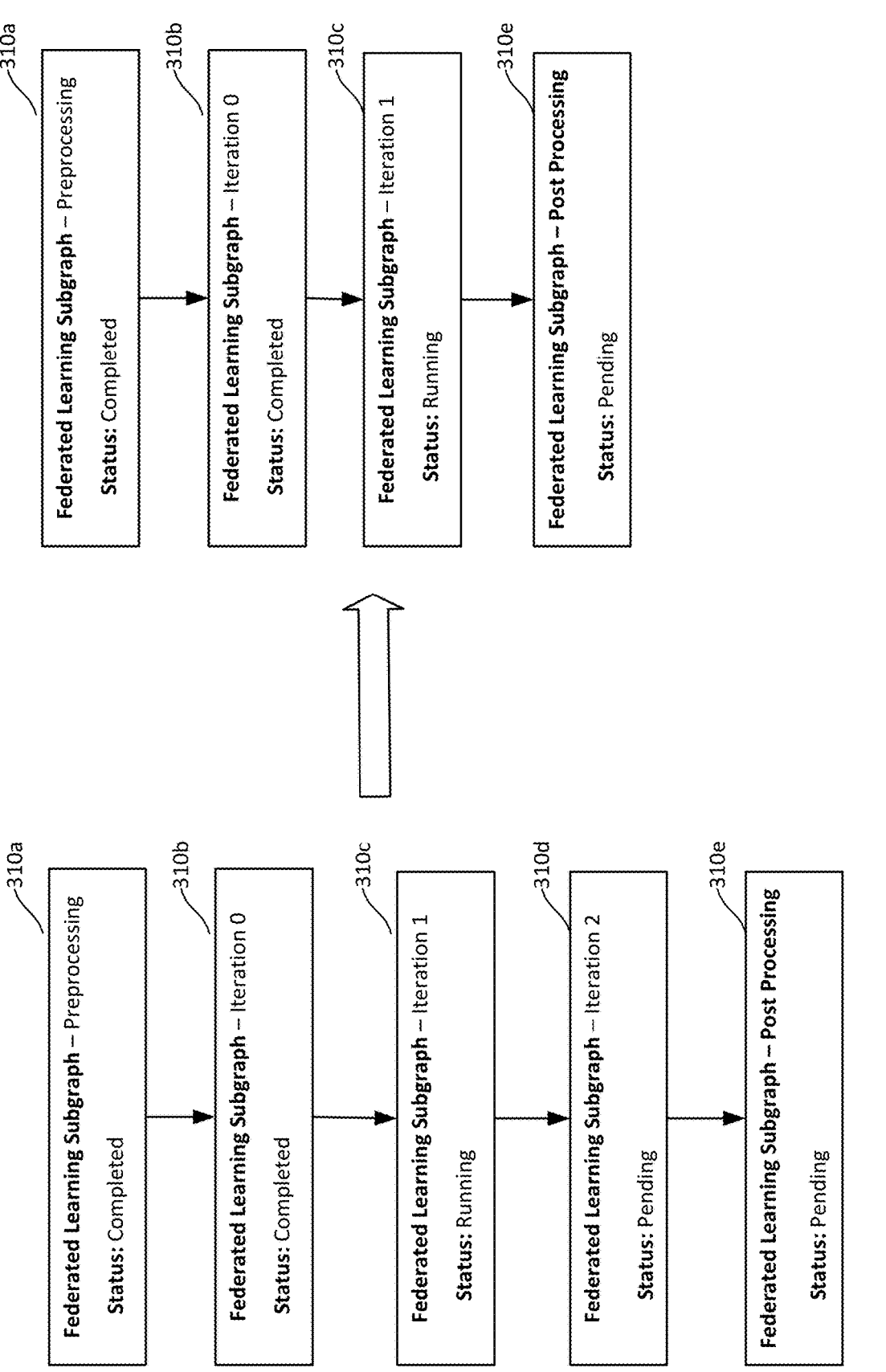
FIG. 3D is a diagram showing another example of the orchestrator dynamically updating the federated learning pipeline shown in FIG. 3A.

FIG. 3D is a diagram showing another example of the orchestrator 110 dynamically updating the federated learning pipeline. In the example implementation shown in FIG. 3D, the left side of the figure shows a first state of the federated learning pipeline in which the training iteration stage 310c is currently running and the right side of the figure shows a second state of the federated learning pipeline in which the orchestrator 110 has dynamically updated the pipeline. In the example shown in FIG. 3D, the model evaluation unit 380 of the orchestrator 110 analyzes the performance of the updated version of the primary ML model generated by the model weight aggregation unit 375 and determines that an additional training iteration stage 310 is unnecessary. In this example, the orchestrator removes the pending training iteration stage 310d. The federated learning pipeline is updated such that upon completion of stage 310c the federated learning pipeline proceeds to the post-processing stage 310e.

The examples implementation shown in FIGS. 3C and 3D are examples of a couple of ways in which the orchestrator 110 may modify the federated learning pipeline. In other implementations, the orchestrator 110 may alter the flow of the federated learning pipeline in other ways. For example, the orchestrator 110 may add other types of additional stages to, modify existing stages of, or remove stages from the federated learning pipeline. In some implementations, the user interface 305 shown in FIG. 3A may provide means for users to define conditions which trigger the orchestrator 110 to add additional stages to, modify existing stages of, or remove stages from the federated learning pipeline.

FIG. 4 is an example flow chart of an example process 400 for using federated learning to train a machine learning model that may be implemented by the orchestrator 110.

The process 400 may include an operation 410 of receiving, in a first silo, configuration parameters for performing federated training of a machine learning model using data stored in the plurality of second silos. The first silo may be the silo associated with the orchestrator 110 and the plurality of second computing environments may be the silos 115 discussed in the preceding examples. The orchestrator 110 may receive configuration parameters for training a machine learning model from a user authorized to access and utilize the orchestrator 110 for training machine learning models. The configuration parameters may include, but are not limited to, the location of computing and storage resources of the orchestrator 110 and the silos 115 which maintain the data which will be used to train the ML model. The configuration parameters may also include hyperparameters associated with the machine learning model to be trained and/or other parameters that may be used to configure the behavior of the federated learning pipeline.

The process 400 may include an operation 420 of generating a federated learning pipeline for automatically executing a plurality of tasks associated with the federated learning of the machine learning model based on the configuration parameters. Operation 420 also includes generating the federated learning pipeline includes automatically generating code, scripts, or both for performing the plurality of tasks for training a local instance of the machine learning model in each respective silo of the plurality of second silos using the data stored in the respective silo and for providing respective learnable parameters information associated with the local instance of the machine learning model to the first silo while ensuring that data protection and privacy requirements associated with the data used to train the local instance of the machine learning model are satisfied. The data used to train the local instance of the machine learning model is not disclosed outside of the respective silo. The user interfaces shown in FIGS. 3A, 3B, 3C, and 3D show various aspects of the federated learning pipeline.

The process 400 may include an operation 430 causing each respective silo of the plurality of second silos to train the local instance of the machine learning model according to the federated learning pipeline. As discussed in the preceding examples, the orchestrator 110 may automatically execute the various processes defined in the stages of the federated learning pipeline including coordinating the performance of various operations on the silos 115 on which the data used to train the model. Each of the silos of the set of second silos 115 on which the federated learning is performed execute the code and/or scripts generated by the orchestrator 110 at each stage of the federated learning pipeline. As discussed in the preceding examples, code signing and/or policy controls may be implemented to ensure the integrity and privacy of the data included in the plurality of second silos 115 are protected.

The process 400 may include an operation 440 of obtaining, at the first silo, the learnable parameters information associated with the local instance of the machine learning model of each silo of the plurality of second silos. Each silo 115 of the plurality of second silos provides the weights, biases, and/or other learnable parameters information of the local instances of the machine learning models to the orchestrator 110 so that the primary instance of the machine learning model maintained by the orchestrator 110 may be fine-tuned based on the learning by the local instances of the machine learning model.

The process 400 may include an operation 450 of aggregating the learnable parameters information obtained from the plurality of second silos to obtain a primary instance of the machine learning model that has been fine-tuned according to the learnable parameters information. The orchestrator 110 aggregates the weights, biases, and/or other learnable parameter information received from each of the silos to fine-tune the primary instance of the machine learning model maintained by the orchestrator 110.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
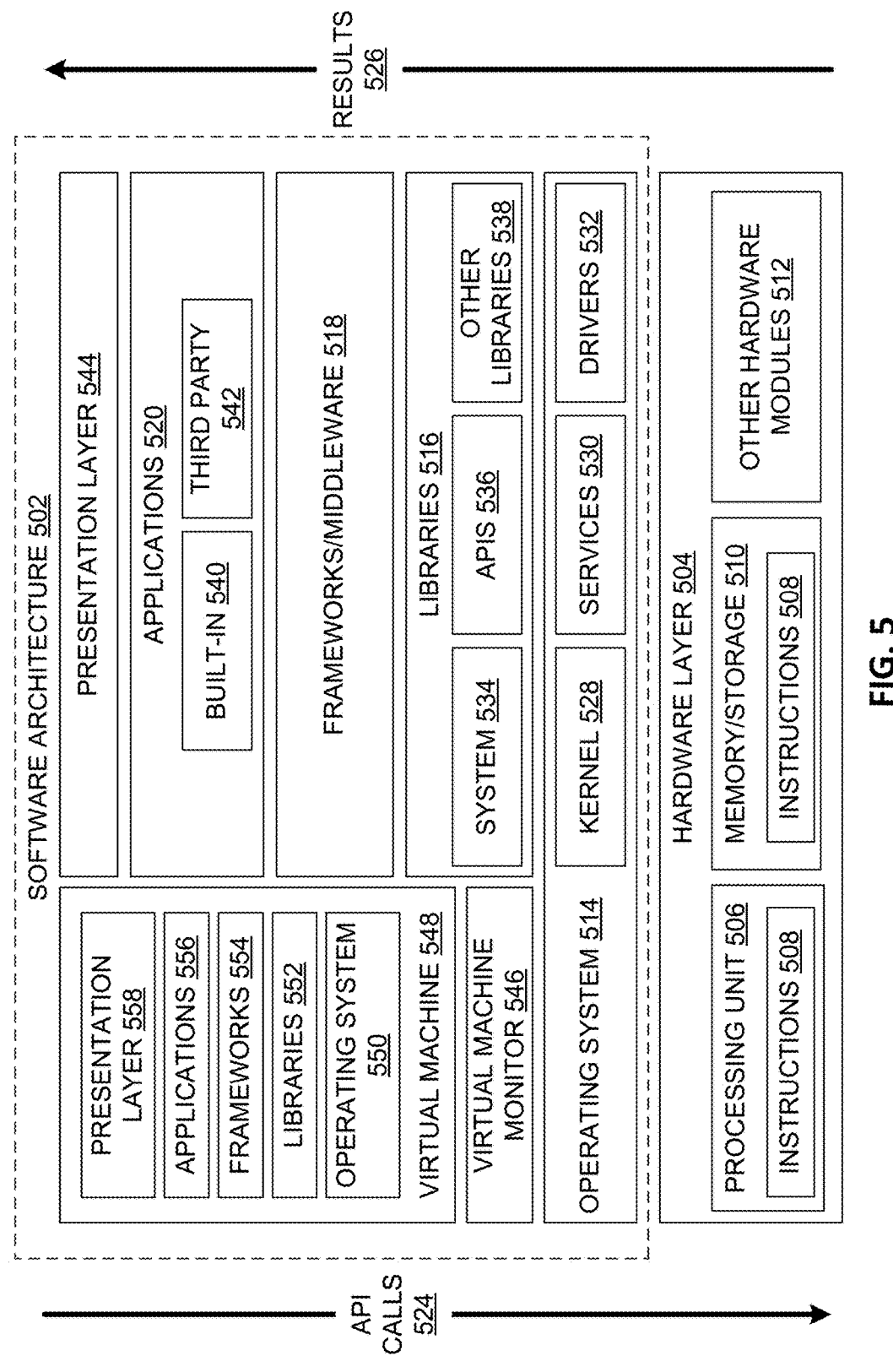
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
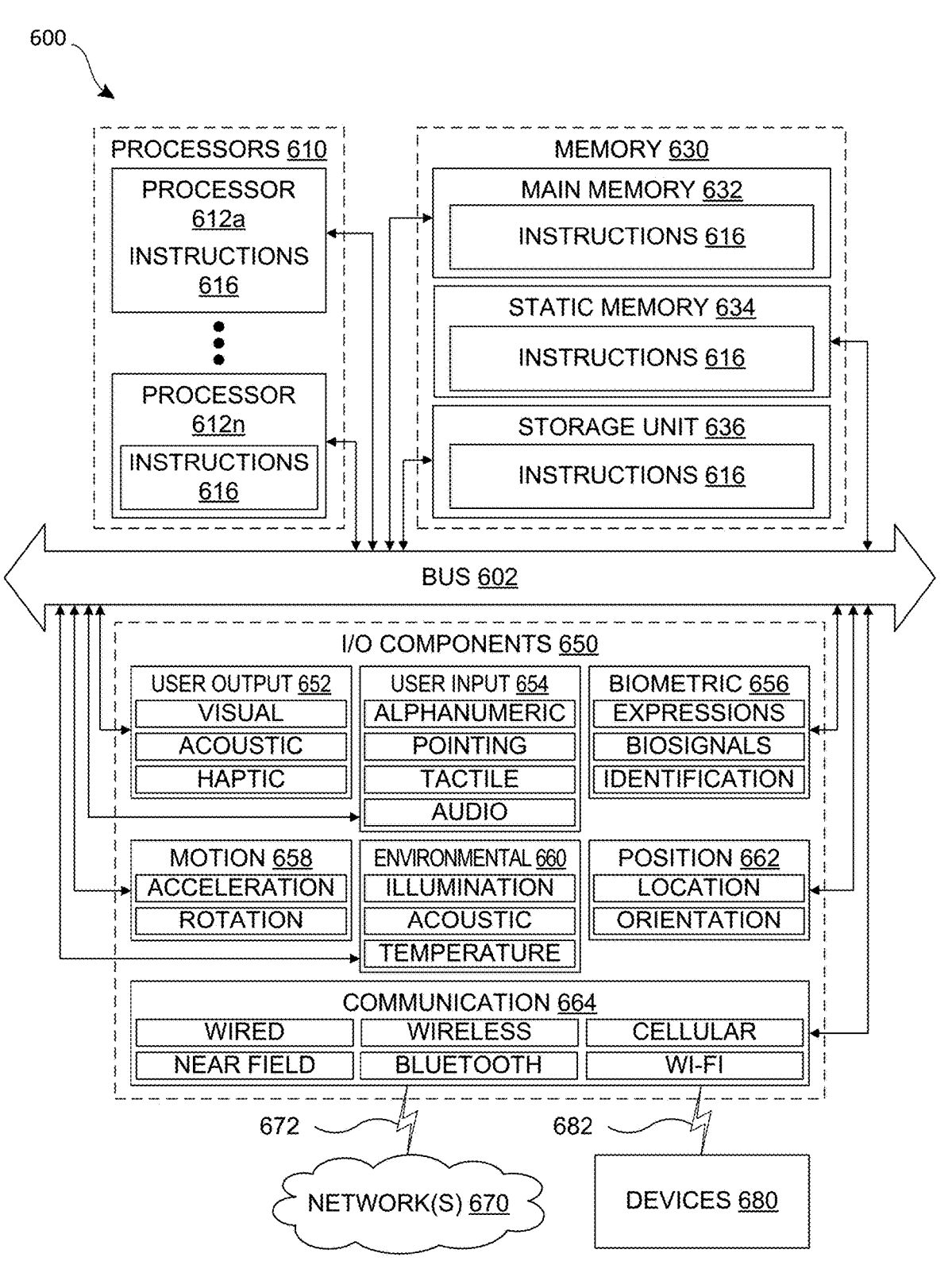
FIG. 6 is a block diagram showing components of an example machine configured to read instructions from a machine-readable medium and perform any of the features described herein.

FIG. 6 is a block diagram illustrating components of an example machine 600 configured to read instructions from a machine-readable medium (for example, a machine-readable medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof.

Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a machine-readable medium storing executable instructions that, when executed, cause the processor to perform operations comprising:

receiving, in a first silo, configuration parameters for performing federated learning of a machine learning model using data stored in a plurality of second silos;

generating a federated learning pipeline, the federated learning pipeline further including a plurality of training iteration stages, for automatically executing a plurality of tasks associated with the federated learning of the machine learning model based on the configuration parameters, including automatically generating code, scripts, or both for performing the plurality of tasks for training a local instance of the machine learning model in each of the plurality of second silos using the data respectively stored in the plurality of second silos, and for providing learnable parameters information associated with the local instance of the machine learning model to the first silo while ensuring that data protection and privacy requirements associated with the data used to train the local instance of the machine learning model are satisfied;

causing a respective silo of the plurality of second silos to train the local instance of the machine learning model according to the federated learning pipeline;

obtaining, at the first silo, the learnable parameters information associated with the local instance of the machine learning model of each silo of the plurality of second silos;

aggregating the learnable parameters information obtained from the plurality of second silos to obtain a primary instance of the machine learning model that has been fine-tuned according to the learnable parameters information, evaluating a performance of the primary instance of the machine learning model by providing reference data to the machine learning model and comparing outputs of the machine learning model with reference output data to perform a determination of whether the performance of the primary instance of the machine learning model satisfies one or more performance criteria; and responsive to the determination, dynamically altering a flow of the federated learning pipeline, including automatically removing one or more of the plurality of training iteration stages from the federated learning pipeline when the one or more performance criteria is satisfied or automatically adding one or more of the plurality of training iteration stages from the federated learning pipeline when the one or more performance criteria is not satisfied.

2. The data processing system of claim 1, wherein causing each respective silo of the plurality of second silos to train the local instance of the machine learning model according to the federated learning pipeline to perform operations of:

receiving, from the first silo, the learnable parameters information associated with the primary instance of the machine learning model maintained by the first silo;

instantiating the local instance of the machine learning model based on the learnable parameters information associated with the primary instance of the machine learning model;

training the local instance of the machine learning model using a local dataset maintained in the respective silo to obtain an updated local instance of the machine learning model;

obtaining the learnable parameters information from the updated local instance of the machine learning model; and providing the learnable parameters information to the first silo.

3. The data processing system of claim 2, wherein the machine-readable medium includes instructions configured to cause the processor to perform operations of:

sending the learnable parameters information associated with the primary instance of the machine learning model to the plurality of second silos;

receiving updated learnable parameters information from each of the plurality of second silos;

aggregating the updated learnable parameters information received from each of the plurality of second silos to obtain aggregated machine learning model parameters; and updating the primary instance of the machine learning model with the aggregated machine learning model parameters.

4. The data processing system of claim 3, wherein the federated learning pipeline further includes a preprocessing stage, and the machine-readable medium includes instructions configured to cause the processor to perform operations of:

during the preprocessing stage, standardizing training data to prepare the training data; and pretraining the primary instance of the machine learning model using the training data.

5. The data processing system of claim 3, wherein the federated learning pipeline further includes a postprocessing stage, and the machine-readable medium includes instructions configured to cause the processor to perform operations of:

during the postprocessing stage, updating weights of the primary instance of the machine learning model according to the updated learnable parameters information.

6. The data processing system of claim 1, wherein generating the federated learning pipeline further comprises operations of:

digitally signing the code, the scripts, or both using a private key associated with the first silo.

7. The data processing system of claim 1, wherein generating the federated learning pipeline further comprises operations of:

determining whether a policy associated with each of the plurality of second silos permit the first silo to initiate jobs on the plurality of second silos.

8. The data processing system of claim 7, wherein determining whether the policy associated with each of the plurality of second silos permit the first silo to initiate jobs on the plurality of second silos further comprises:

determining whether each respective second silo of the plurality of second silos is associated with a same workspace as the first silo.

9. The data processing system of claim 7, wherein generating the federated learning pipeline further comprises operations of:

determining whether an access control policy associated with each of the plurality of second silos permits the first silo to access the learnable parameters information associated with the local instance of the machine learning model.

10. A method implemented in a data processing system for performing federated learning of a machine learning model, the method comprising:

receiving, in a first silo, configuration parameters for performing federated training of the machine learning model using data stored in a plurality of second silos;

generating a federated learning pipeline, the federated learning pipeline further including a plurality of training iteration stages, for automatically executing a plurality of tasks associated with the federated learning of the machine learning model based on the configuration parameters, including automatically generating code, scripts, or both for performing the plurality of tasks for training a local instance of the machine learning model in a respective silo of the plurality of second silos using the data stored in the respective silo, and for providing learnable parameters information associated with the local instance of the machine learning model to the first silo while ensuring that data protection and privacy requirements associated with the data used to train the local instance of the machine learning model are satisfied;

causing each respective silo of the plurality of second silos to train the local instance of the machine learning model according to the federated learning pipeline;

obtaining, at the first silo, the learnable parameters information associated with the local instance of the machine learning model of the respective silo of the plurality of second silos;

aggregating the learnable parameters information obtained from the plurality of second silos to obtain a primary instance of the machine learning model that has been fine-tuned according to the learnable parameters information, evaluating a performance of the primary instance of the machine learning model by providing reference data to the machine learning model and comparing outputs of the machine learning model with reference output data to perform a determination of whether the performance of the primary instance of the machine learning model satisfies one or more performance criteria; and responsive to the determination, dynamically altering a flow of the federated learning pipeline, including automatically removing one or more of the plurality of training iteration stages from the federated learning pipeline when the one or more performance criteria is satisfied or automatically adding one or more of the plurality of training iteration stages from the federated learning pipeline when the one or more performance criteria is not satisfied.

11. The method of claim 10, wherein causing each respective silo of the plurality of second silos to train the local instance of the machine learning model according to the federated learning pipeline further includes operations of:

receiving, from the first silo, the learnable parameters information associated with the primary instance of the machine learning model maintained by the first silo;

instantiating the local instance of the machine learning model based on the learnable parameters information associated with the primary instance of the machine learning model;

training the local instance of the machine learning model using a local dataset maintained in the respective silo to obtain an updated local instance of the machine learning model;

obtaining the learnable parameters information from the updated local instance of the machine learning model; and providing the learnable parameters information to the first silo.

12. The method of claim 11, further including:

sending the learnable parameters information associated with the primary instance of the machine learning model to the plurality of second silos;

receiving updated learnable parameters information from each of the plurality of second silos;

aggregating the updated learnable parameters information received from each of the plurality of second silos to obtain aggregated machine learning model parameters; and updating the primary instance of the machine learning model with the aggregated machine learning model parameters.

13. The method of claim 12, further including:

providing a preprocessing stage in the federated learning pipeline;

during the preprocessing stage, standardizing training data to prepare the training data; and pretraining the primary instance of the machine learning model using the training data.

14. The method of claim 12, further comprising:

providing a postprocessing stage in the federated learning pipeline; and during the postprocessing stage, updating weights of the primary instance of the machine learning model according to the updated learnable parameters information.

15. The method of claim 10, wherein generating the federated learning pipeline further comprises operations of:

digitally signing the code, the scripts, or both using a private key associated with the first silo.

16. A machine-readable medium on which are stored instructions that, when executed, cause a processor of a programmable device to perform operations of:

receiving, in a first silo, configuration parameters for performing federated learning of a machine learning model using data stored in a plurality of second silos;

generating a federated learning pipeline, the federated learning pipeline further including a plurality of training iteration stages, for automatically executing a plurality of tasks associated with the federated learning of the machine learning model based on the configuration parameters, including automatically generating code, scripts, or both for performing the plurality of tasks for training a local instance of the machine learning model in a respective silo of the plurality of second silos using the data stored in the respective silo, and for providing learnable parameters information associated with the local instance of the machine learning model to the first silo while ensuring that data protection and privacy requirements associated with the data used to train the local instance of the machine learning model are satisfied;

causing each respective silo of the plurality of second silos to train the local instance of the machine learning model according to the federated learning pipeline;

obtaining, at the first silo, the learnable parameters information associated with the local instance of the machine learning model of each silo of the plurality of second silos;

aggregating the learnable parameters information obtained from the plurality of second silos to obtain a primary instance of the machine learning model that has been fine-tuned according to the learnable parameters information, evaluating a performance of the primary instance of the machine learning model by providing reference data to the machine learning model and comparing outputs of the machine learning model with reference output data to perform a determination of whether the performance of the primary instance of the machine learning model satisfies one or more performance criteria; and responsive to the determination, dynamically altering a flow of the federated learning pipeline, including automatically removing one or more of the plurality of training iteration stages from the federated learning pipeline when the one or more performance criteria is satisfied or automatically adding one or more of the plurality of training iteration stages from the federated learning pipeline when the one or more performance criteria is not satisfied.

17. The machine-readable medium of claim 16, wherein causing each respective silo of the plurality of second silos to train the local instance of the machine learning model according to the federated learning pipeline to perform operations of:

receiving, from the first silo, the learnable parameters information associated with the primary instance of the machine learning model maintained by the first silo;

instantiating the local instance of the machine learning model based on the learnable parameters information associated with the primary instance of the machine learning model;

training the local instance of the machine learning model using a local dataset maintained in the respective silo to obtain an updated local instance of the machine learning model;

obtaining the learnable parameters information from the updated local instance of the machine learning model; and providing the learnable parameters information to the first silo.

18. The machine-readable medium of claim 17, wherein each training iteration stage is configured to cause the first silo to perform operations of:

sending the learnable parameters information associated with the primary instance of the machine learning model to the plurality of second silos;

receiving updated learnable parameters information from each of the plurality of second silos;

aggregating the updated learnable parameters information received from each of the plurality of second silos to obtain aggregated machine learning model parameters; and updating the primary instance of the machine learning model with the aggregated machine learning model parameters.

19. The machine-readable medium of claim 18, further comprising instructions configured to cause the processor to perform operations of:

providing a preprocessing stage in the federated learning pipeline;

during the preprocessing stage, standardizing training data to prepare the training data; and pretraining the primary instance of the machine learning model using the training data.

20. The machine-readable medium of claim 18, further comprising instructions configured to cause the processor to perform operations of:

providing a postprocessing stage in the federated learning pipeline; and during the postprocessing stage, updating weights of the primary instance of the machine learning model according to the updated learnable parameters information.

* * * * *